(12) United States Patent
Khare et al.

(10) Patent No.: US 7,379,963 B1
(45) Date of Patent: May 27, 2008

(54) DELIVERY OF ANY TYPE OF INFORMATION TO ANYONE ANYTIME ANYWHERE

(75) Inventors: Rohit Khare, Ellicott City, MD (US);
Adam Rifkin, Wilton, CT (US);
Peyman Oreizy, Kirkland, WA (US)

(73) Assignee: KnowNow-Delaware, Menlo Park, CA (US)

( * ) Notice: Subject to any disclaimer, the term of this patent is extended or adjusted under 35 U.S.C. 154(b) by 425 days.

(21) Appl. No.: 09/615,663

(22) Filed: Jul. 14, 2000

(51) Int. Cl.
*G06F 15/13* (2006.01)

(52) U.S. Cl. .......................... 709/203; 709/231; 707/2; 707/5

(58) Field of Classification Search ................ 709/203, 709/219, 231; 707/5–6, 10, 102, 103, 2
See application file for complete search history.

(56) References Cited

U.S. PATENT DOCUMENTS

| 5,442,778 | A | | 8/1995 | Pedersen et al. | |
|---|---|---|---|---|---|
| 5,649,186 | A | | 7/1997 | Ferguson | |
| 5,801,957 | A | | 9/1998 | Lehman et al. | |
| 5,933,849 | A | | 8/1999 | Srbljic et al. | |
| 5,937,163 | A | | 8/1999 | Lee et al. | |
| 5,953,732 | A | | 9/1999 | Meske, Jr. et al. | |
| 5,987,460 | A | | 11/1999 | Niwa et al. | |
| 6,035,339 | A | * | 3/2000 | Agraharam et al. | ........ 709/246 |
| 6,073,170 | A | | 6/2000 | Sumita et al. | |
| 6,112,246 | A | * | 8/2000 | Horbal et al. | ............... 709/230 |
| 6,163,795 | A | * | 12/2000 | Kikinis | ....................... 709/203 |
| 6,178,424 | B1 | * | 1/2001 | Okumura et al. | ............. 707/10 |
| 6,182,066 | B1 | * | 1/2001 | Marques | ........................ 707/5 |
| 6,230,205 | B1 | * | 5/2001 | Garrity et al. | ............... 709/231 |
| 6,349,307 | B1 | * | 2/2002 | Chen | ....................... 707/103 X |
| 6,457,046 | B1 | * | 9/2002 | Munakata | ................... 709/216 |
| 6,578,025 | B1 | * | 6/2003 | Pollack et al. | ................. 707/2 |
| 6,581,207 | B1 | * | 6/2003 | Sumita et al. | ................ 725/46 |
| 6,671,715 | B1 | * | 12/2003 | Langseth et al. | ........... 709/203 |
| 6,725,460 | B1 | * | 4/2004 | Nishiyama et al. | ........... 725/32 |
| 6,910,070 | B1 | * | 6/2005 | Mishra et al. | ............... 709/224 |

FOREIGN PATENT DOCUMENTS

| WO | WO 98/53410 | 11/1998 |
|---|---|---|
| WO | WO 99/05584 | 2/1999 |

* cited by examiner

*Primary Examiner*—Jinsong Hu
(74) *Attorney, Agent, or Firm*—Blakely Sokoloff Taylor & Zafman LLP

(57) ABSTRACT

Information delivery system and methods detects and organizes information into canonical topics, such as who, what, when, where, price, etc., and facilitates a user to persistently subscribe to topics, web users, web resources, event streams, etc. The system facilitates a user to register devices and applications on which to receive information, as it becomes available, related to the subscription(s). The system facilitates users to specify preferences for the topics, web users, web resources, and registrations, which prioritize delivery of information. The system senses information, aggregates the user's registrations, subscriptions, and preferences, and filters information a topic-interest basis. The system notifies a user based on the preferences.

9 Claims, 9 Drawing Sheets

DELIVERY OF ANY TYPE OF INFORMATION TO ANYONE ANYTIME ANYWHERE

BACKGROUND OF THE INVENTION

1. Field of the Invention

The present invention relates to the field of information processing. More specifically, the present invention relates to the worldwide delivery of information of any type to anyone at any place and time.

2. Background Information

Nowadays there is a great demand for information, especially considering that more people recognize how empowering information can be. Sometimes the information we seek is for work; many times it is for entertainment. Take the case of Miguel, an avid fan of the musical group R.E.M. Miguel wants to know any and everything about REM. He wants to know biographical information on the band members, concert dates, trivia, new music release dates, etc.

To find information, Miguel can surf the net in hopes of stumbling across information about R.E.M. He will likely find information related to the musical group R.E.M., such as official R.E.M. websites, unofficial R.E.M. websites, newsgroups for R.E.M. discussions, etc. Miguel will also find several websites on resource and environmental management, R.E. Mahler graphic arts, etc.

The problem is that this process of accessing information from the web can be time consuming and frustrating. For example, Miguel can sift through all this information and eliminate the websites on resource and environmental management and R.E. Mahler graphic arts. After a while, however, all Miguel wants is new information on the musical group R.E.M. There is no easy way for Miguel to know when there is new information about R.E.M, however. To get any new information, Miguel has to go to the same web pages, which don't really change very often and sift through them looking for the new information. He can surf for new websites, but will likely pull up websites on resource and environmental management and R.E. Mahler graphic arts again. The process of accessing information from the web can be even more troublesome when trying to access obscure information. What should be an empowering experience suddenly becomes quite disconcerting.

Timely delivery of information is also crucial, especially when trying to fit entertainment into our busy schedules. Suppose that R.E.M. has announced that they are playing a concert in Miguel's hometown this summer. Anyone who knows anything about R.E.M. knows that the concerts sell out very quickly, sometimes in a matter of hours. Miguel needs to know as soon as the concert is announced to make sure he gets tickets.

If he has subscribed to an official R.E.M. website he should get an email sent to his mailbox. However, any email sent is only as timely as Miguel is in checking it. If Miguel is not online, he misses the email. If Miguel is not checking this particular mailbox, he misses the email. Even if Miguel is checking his mailbox regularly, sometimes email delays can be several days such that by the time Miguel gets the email, the concert is sold out. Because Miguel did not have a more timely way to get his information, the concert event of a lifetime turns into a huge disappointment.

The advent of cell phones, computers, pagers, and other personal communication devices allows us to conduct our affairs in a more decentralized fashion. Miguel could be at home for the evening, in Hong Kong for a few days, or at a football game on Sunday afternoon. He still wants this information delivered to him regardless of where he is. What is needed therefore is delivery of any type of information to anyone at any time and at any place.

SUMMARY

Presented herein is a system and corresponding methods to send and receive any type of information to anyone at anytime and anywhere. One aspect of the invention organizes information into canonical topics, such as "who," "what," "when," and/or "where," facilitates a user to persistently subscribe to a topic, routes the information to the user based on the user's level of interest in a topic.

Initially, a user subscribes to information of interest to the user, registers devices and application on which to receive subscriptions and specifies a threshold level of interest in a topic. A user also specifies device profiles for each device and an application profile for each application. When information relating to the subscribed topic is sensed, the system consults the device and application profiles and routes the information accordingly.

Another aspect of the invention delivers the information to the user on microserver-equipped client systems. Other features and advantages as well as the structure and operation of various embodiments are described in detail below.

BRIEF DESCRIPTION OF THE DRAWINGS

The invention is best understood by reference to the figures wherein references with like reference numbers generally indicate identical, functionally similar, and/or structurally similar elements. The drawing in which an element first appears is indicated by the leftmost digit(s) in the reference number in which.

DETAILED DESCRIPTION

1. Overview and Discussion of the Invention

A system and corresponding methods to receive send and receive any type of information at anytime and anywhere is described herein. In the following description, various aspects of the invention are described. However, it will be apparent to those skilled in the art that the invention may be practiced with only some or all aspects of the invention. For purposes of explanation, specific numbers, methods, materials and configurations are set forth in order to provide a thorough understanding of the invention. However, it will also be apparent to one skilled in the art that the invention may be practiced without the specific details. In other instances, well-known features are omitted or simplified in order not to obscure the invention.

Some parts of the description will be presented using terms such as protocol, module, application, functionality, and so forth, commonly employed by those skilled in the art to convey the substance of their work to others skilled in the art. Other parts of the description will be presented in terms of operations performed by a computer system, using terms such as facilitating, determining, reducing, transmitting, and so forth. As is well understood by those skilled in the art, these quantities and operations take the form of electrical, magnetic, or optical signals capable of being stored, transferred, combined, and otherwise manipulated through mechanical and electrical components of a digital system; and the term "digital system" includes general purpose as well as special purpose data processing machines, systems, and the like, that are standalone, adjunct or embedded.

Various operations will be described as multiple discrete steps performed in turn in a manner that is most helpful in understanding the invention. However, the order in which they are described should not be construed to imply that these operations are necessarily order dependent or that the operations be performed in the order in which the steps are presented. Furthermore, the phrase "in one embodiment" will be used repeatedly, however the phrase does not necessarily refer to the same embodiment, although it may.

The invention is described below in further detail with respect to several examples for illustration. It should be understood, however, that the invention may be implemented in several other embodiments. A method in accordance with the invention is described below first.

2. Example Systems and Method

Figure 1:
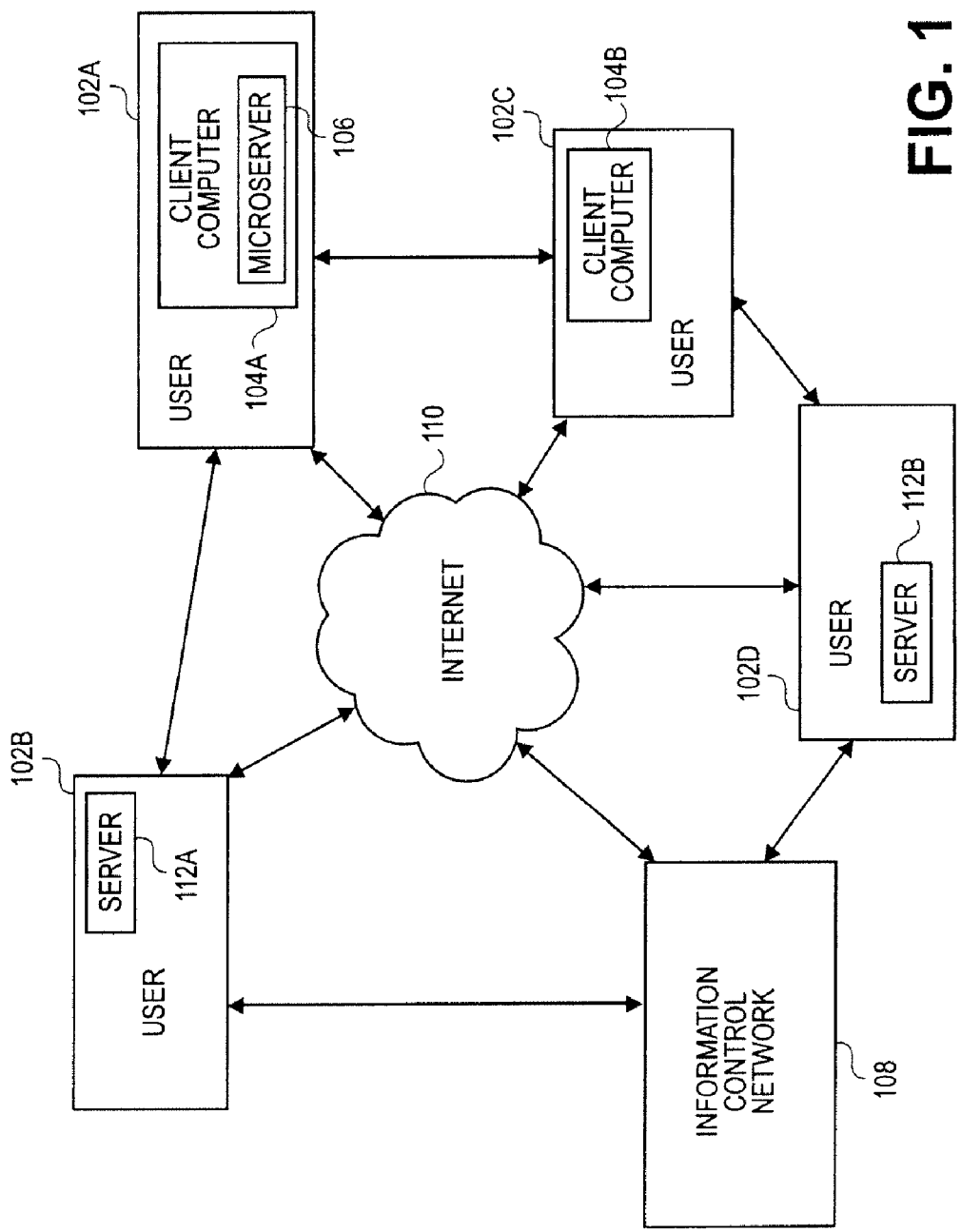
FIG. 1 is a block diagram of a communication environment suitable for implementing aspects of the invention.

FIG. 1 is a block diagram illustrating an overview of aspects of the invention in accordance with an embodiment. As illustrated several users 102a, 102b, 102c, and 102d (collectively the user(s) 102) are coupled to each other and to an information control network 108. The users and the information control network are coupled to the Internet 110.

Any of the users 102 can be publishers or consumers of information. According to the exemplar in FIG. 1, the user 102b is a publisher, which provides information via the information control network 108, to other users, and over the Internet 110 via a computer server 112a. The same is true for the user 102d, which has a computer server 112b. (The computer servers 112a and 112b are referred to collectively as the computer server(s) 112).

For ease of understanding, four users are shown. It will be readily apparent to those of ordinary skill in the art that any number of users could be included without affecting the spirit and scope of the invention.

The computer servers 112 can be a broad range of data sources, business, education, entertainment, and the like, constituted with a single or cluster of shared or dedicated computer servers. Suitable computer servers include, but are not limited to those available from IBM of Armonk, N.Y. and Sun Microsystems of Mountain View, Calif.

Also according to the exemplar in FIG. 1, the users 102a and 102c are consumers, which persistently request information in accordance with the present invention, and subsequently receive notification that the requested information is available from another user 102, the information control network 108, and/or the Internet 110. Thus, the users 102a and 102c use client computers 104a and 104b (collectively client computer(s) 104) to request, and subsequently receive information, as it becomes available, from the computer servers 112. The user 102a has a microserver 106 embedded in its client computer 104a, which facilitates the user 102a to be a publisher as well as a consumer.

Except for the microserver 106, the client computers 104 are intended to represent a broad range of well-known computers of any number of forms, desktop, laptop, handheld, and the like, equipped with the proper communication or networking equipment, as well as operating systems and other software. Suitable client computers include, but are not limited to those available from Dell Computer of Austin, Tex. and Apple Computers of Cupertino, Calif. Operating systems include, but are not limited to the Windows® family of operating systems available from Microsoft® Corporation of Redmond, Wash., Linux available from Red Hat of Durham, N.C., and OS/& available from Apple Computers of Cupertino, Calif.

Any of the client computers 104 may be equipped with a well-known web browser (not shown), which facilitates accessing and surfing the world-wide-web (web) using the Internet 110. Suitable web browsers include, but are not limited to Internet Explorer available from Microsoft® Corporation of Redmond, Wash. and Netscape Navigator available from Netscape® Communication of Mountain View, Calif.

The microserver 106 is a "stripped down" web server, having minimal functionality to support delivering of requested information in the form of a request to store information from information control network 108. As will be described in more detail below, the employment of micro-server 106 facilitates the user to persistently submit their requests for information, and subsequently receive the information as they become available, without requiring the users to remain "connected" to the information control network 108, while awaiting availability of the requested information. The functionality to support a request to store information is known in the art, and implemented in many well-known web servers. Accordingly, implementation of these functionalities will not be further described.

The information control network 108 is equipped to detect publication of information, organize information into topics, to facilitate the users 102a and 102c to persistently subscribe to information related to topics of interest, to dynamically route information subscribed to the users 102a and 102c based on the topic and their particular levels of interest, and to deliver the information matching the subscription to the users 102a and 102c on the client computers 104a and 104b.

In one embodiment, the information control network 108 is a single centralized network through which all detections, organizations, subscriptions, registrations, preferences, and information flows. In another embodiment, the information control network 108 is located within an organization without being connected to the "outside world." In this embodiment, the information control network 108 also hosts business logic rules.

The Internet 110 is intended to represent a broad range of public and private data networks that have hubs, routers, switches, gateways, and the like, known in the art, and not necessarily "the Internet" of common usage. Suitable networking equipment is available from CISCO Systems and 3COM, both of San Jose, Calif.

Figure 2:
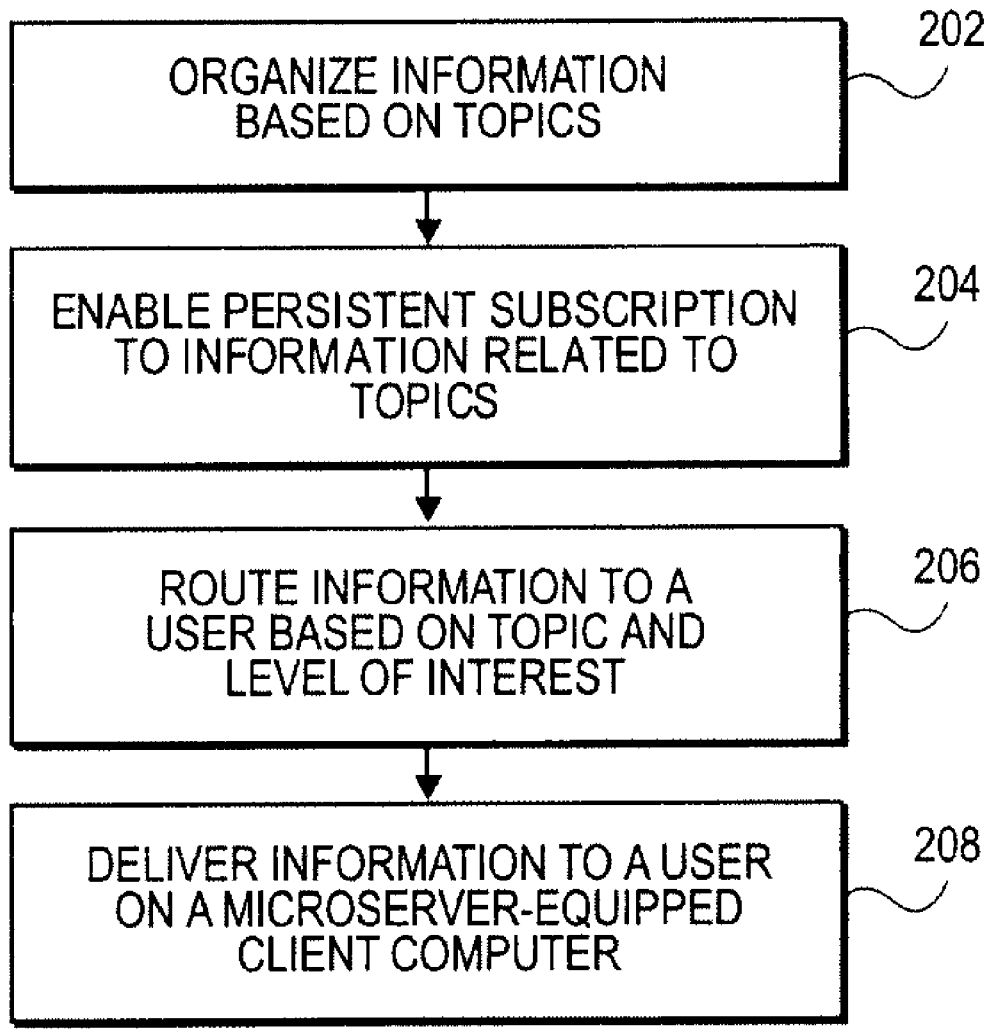
FIG. 2 illustrates a method of the invention in accordance with one embodiment.

FIG. 2 illustrates a method 200 performed in accordance with an aspect of the present invention. At 202, an embodiment of the present invention organizes information into topics.

At 204, an embodiment facilitates a user 102 to persistently subscribe to one or more topics. To fulfill the user 102's subscription the information control network 108 continuously and independently monitors/searches the Internet 110 for information related to the topic(s). An advantage the persistent subscription feature is that the user 102 is relieved from having to make multiple requests for information. The network 108 effectuates the repetitive/continuous request transparently to the user 102.

At 206, an embodiment routes information to a user 102 based on the user 102's level of interest in the topic. A user 102's level of interest can be determined in various ways. One embodiment facilitates a user 102 to generate device profiles and application profiles which set priorities for which topics are to be routed to which devices and/or applications. Priorities can depend on the time, day, date, etc. In another embodiment, the network 108 determines which topics are to be routed to which devices and/or applications based on a user 102's response to receipt of earlier information.

At 208, an embodiment delivers information matching the subscription to a user 102, on a user device or user application, or on a microserver-equipped client computer. In one embodiment, initially, the user 102 registers a client computer with the network 108 as a device on which to receive information, as it becomes available, under a subscription.

Of course, it is well known that conventional client computers can make requests for information and receive the requested information synchronously by maintaining the communication connection, as in the case of a web browser, or receiving the requested information asynchronously by employing alternate channels, such as emails. Conventional client computers, however, cannot allow pseudo-synchronous responses to requests for information without either maintaining the communication connection open or employing an alternate communication channel. The microserver-equipped client computer 104*a* can "locally" maintain (i.e., on the client computer itself) a communication path between the information-request-making application and receive the requested information on the application's behalf as an "independent" request for service from the information control network 108.

Figure 3:
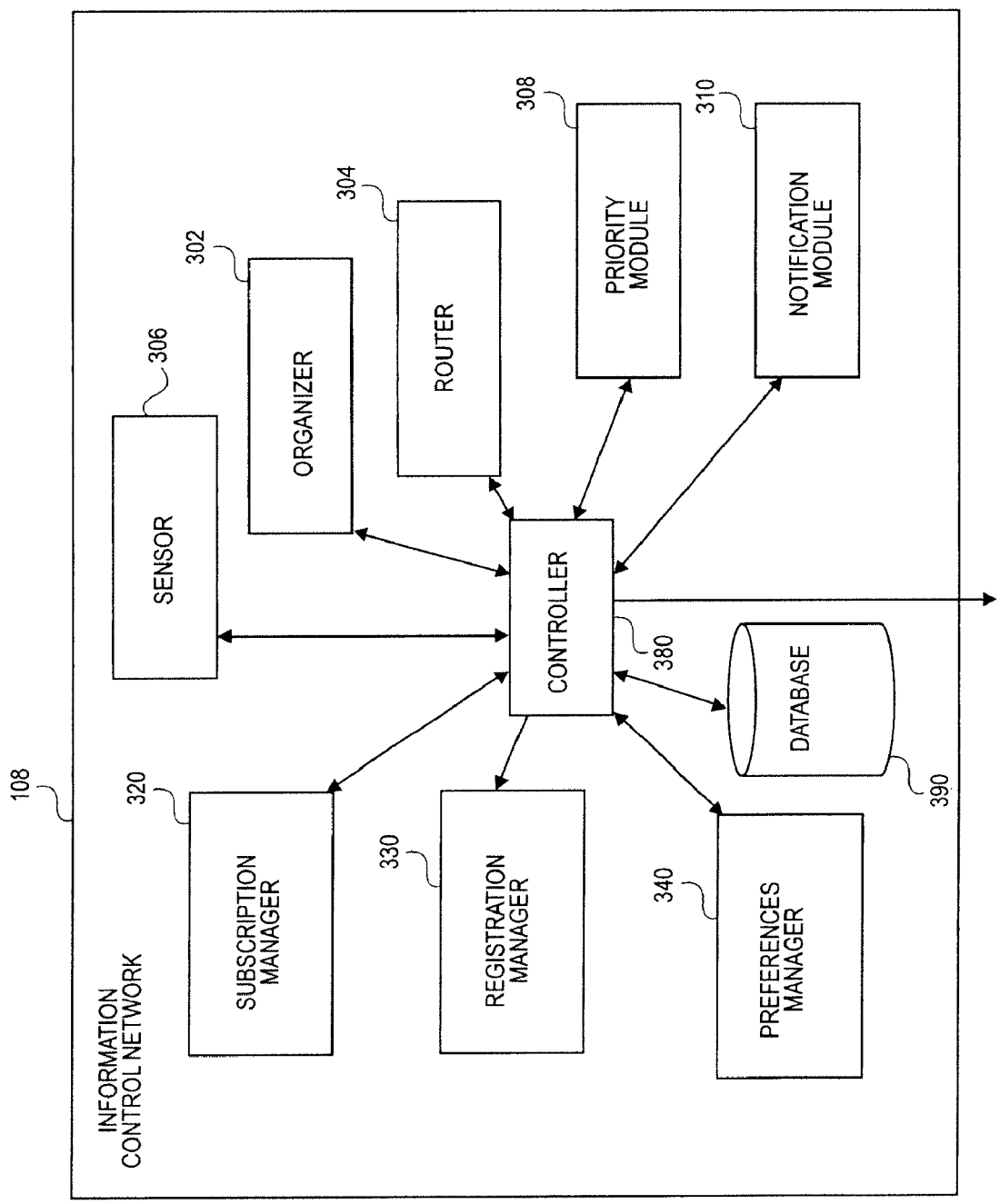
FIG. 3 is a block diagram of the information control network 108 of FIG. 1.

FIG. 3 is a block diagram of the information control network 108 in more detail. The information control network 108 includes an organizer 302, a router 304, a sensor 306, a priority module 308, and a notification module 310. Of course, the information control network 108 does not necessarily have to be partitioned among these particular functionalities. The organizer 302 organizes information into canonical topics. The router 304 routes information to a user based on the user 102's level of interest. The sensor 306 senses published information. The priority module 308 filters information according to a user 102's preferences. The priority module 308 also scores information according to a user 102's preferences. The notification module 310 notifies a user 102 that information that the user 102 has subscribed to is available.

The information control network 108 also includes a subscription manager 320 that manages subscriptions to information, a registration manager 330, which manages registration of devices and applications, and a preferences manager 340, which manages preferences for the users 120.

The information control network 108 also includes a controller 380, which facilitates communication within the information control network 108. The controller 380 facilitates cooperation among the organizer 302, the router 304, the sensor 306, the priority module 308, the notification module 310, the subscription manager 320, the registration manager 330, and the preferences manager 340. The controller 380 also facilitates communication and cooperation of the information control network 108 with the users 102 and the Internet 110.

The information control network 108 also includes a database 390 to store information about topics, registration, subscriptions, users 102 preferences, routing, etc. The database 390 includes at least one index generator to generate index information that identifies relationships among the users 102 and topics, registration, subscriptions, preferences, priorities, etc. The index information establishes the organization of the information stored in the database 390.

In one embodiment, the database 390 is a dedicated computer running a relational database. Of course, the database 390 can be implemented using any database management system that facilitates multiple processors to manipulate the stored information. Moreover, although the database 390 is depicted as only one database, persons of ordinary skill in the relevant art will readily recognize how to implement the database 390 using more than one database.

Suitable database management systems include Microsoft Access available from Microsoft Corporation in Redmond, Wash. or any well-known Structured Query Language (SQL) computer server. Moreover, many of the functions implemented by the database 390 can be implemented by other components.

The information control network 108 senses or detects information from various locations. Sources of information can be electronic libraries, databases, business process, legacy environments (e.g., file computer servers, Notes), email applications, instant messaging applications, chat applications, or other information in electronic form, such as information posted on websites and message boards. The information can also be from news services, file sharing applications, network management applications, etc.

In one embodiment, the information control network 108 is passive and waits for information to be published. In another embodiment, the information control network 108 is active and crawls the various sources looking for information of interest. The information control network 108 scrapes information using well-known robot crawlers and text analysis techniques, and suitable systems are available from Napster.com in San Mateo, Calif. and FaceTime.com in Foster City, Calif.

A user 102 may be interested in information just published on a web site. Conventional systems find the web site and repeatedly poll it. If the web site changes, the conventional systems send an email to the user 102 indicating that the web site has changed. Typical conventional systems do not provide information on what the information changed from and changed to. One such system is available from Netmind.com.

According to one embodiment of the invention, the information control network 108 senses what the information changed from and changed to because it organizes the event based on its XML tags (e.g., the publisher marked up the electronic information with "who, what, when, where" XML tags), which is described more fully below.

3. Organizing Information Based on Canonical Topics

In one embodiment, the information control network 108 organizes information into canons that include "who," "what," "when," and/or "where." Information can be organized based on other canons as well. For example, "price" can be a canon. Suppose that a Bach concert is being held Thursday, Oct. 12, 2000 at 7:00 p.m. at the Orange County Performing Arts Center. The organization sponsoring the concert issues this fact as an "event." The organization also may post the information on its web site.

Other web sites, such as Ticket Master, may also post the information. The "event" has a specific who, what, when, where, etc. For example, the "who" is "Bach," the "what" is "concert," the "when" is "Thursday, Oct. 12, 2000 at 7:00 p.m." and the "where" is "Orange County Performing Arts Center." The "what" also cross-posts as "symphony" because it is a synonym of "concert."

Information organized under the "who" topic can include names of individual people, groups of people, etc. The names can be personal, such as John, James, Gerald, the Jefferson's, etc., or common, such as boys, firemen, teachers, biologists, etc.

Information organized under the "what" topic can include any type of information, and is generally arranged by category, sub-category, sub-sub-category, etc. Exemplar "what" categories can include recreation, entertainment, fashion, etc., while exemplar sub-categories can include indoor recreation and outdoor recreation, concerts and movies, men's fashion and women's fashion.

Information organized under the "when" topic can include times, such as "10:00 o'clock a.m.," days, such as "Sundays," and dates, such as "Feb. 19, 1935." The "when" topic also can include times of day, such as "morning" or "lunchtime." The "when" topic also can include "weekends" or "Father's Day."

Information organized under the "where" topic can be a galaxy, planet, country, state, city, street, address, etc. Thus, it can be as broad as "Milky Way Galaxy," "Earth" "West Coast," "Pacific Northwest," "Washington," and a narrow as "Woodinville," and "Chateau Ste. Michelle Winery."

When the organizer analyzes information, the organizer 302 considers linguistic relationships, such as synonyms, hypernyms, hyponyms, etc. Thus, the organizer 320 knows that "entertainment" is a hypernym (or sub-category) of "music," which is a hypernym of "classical," and that "reggae" is a hyponym of "music" and that "music" is a hyponym of "entertainment." The organizer 302 also knows that "music" is a hyponym of "arts." Likewise, the organizer 302 knows that with respect to music, "country" is a synonym of "western." The organizer 302 also knows that "symphony" is a synonym of "concert," and, as such, that a Los Angeles Times "symphony" event is comparable to a New York Times "concert" event.

The information control network 108 also cross-posts information. Thus, from the example above, the "what" of the Bach concert also cross-posts as "symphony" because it is a synonym of "concert." The "where" of "Orange County Performing Arts Center" cross-posts to the "where" of "California" because Orange County Performing Arts Center is a hyponym of California. Moreover, the topic "Performing Arts Centers" would include hyponyms such as Benaroya Hall in Seattle, Wash., Constitution Hall in Washington, D.C., and the Chateau Ste. Michelle Winery in Woodinville, Wash.

The "event" indicating that the Bach concert is being held Thursday, Oct. 12, 2000 at 7:00 p.m. at the Orange County Performing Arts Center therefore also may trigger other "events." For example, a non-profit watch organization may trigger "events" whenever it receives an "event" from a non-profit organization.

The organizer 302 also considers what the words mean in context, or their semantics. For example, the organizer 302 knows that words can have several meanings, which change depending on the audience. Thus the organizer 302 knows that to a New Yorker "San Francisco" may include "San Jose," but to anyone who lives in San Jose, "San Francisco" does not include "San Jose."

Information can come from a variety of sources and generally includes any information available in cyberspace, on the web, on the Internet, etc. Information typically is generated by commercial corporations, government entities, media, religious and other non-profit organizations, hospitals, etc. Although information has been referred to as an "event," information may also be referred to as "non-events," "alerts," "messages," "queries," "data," "data content," "consumer/customer information," or other terminology that can be interpreted to mean information usable by cyberspace and/or Internet users. Information can also be patterns, streams, queues, etc.

Information can be in any language, such as English, Spanish, Japanese, Swedish, Chinese, Hebrew, Swahili, Portuguese, Farsi, Afrikaans, etc., and can be in any form, such as video, audio, multimedia, or streaming media. This includes text, graphical images, computer-animated graphics, sound effects, and music, for example. Of course, a specific type, form, or language of information is not important for the invention, and those skilled in the art will understand that a wide variety of information may be made available on the web. That is, any type of information in any form or language can be made available to the users 102.

The organizer 302 assigns "who" "what" "when" and/or "where" extensible markup language (XML) tags (who-what-when-where XML tags) to information. Alternatively, a user can assign "who" "what" "when" and/or "where" XML tags to information prior to publishing it. The "who" "what" "when" and/or "where" XML tags operate as a protocol (the who-what-when-where protocol) rather than a static, binary, language-specific application programming interface (API) that can trip up internet-scale heterogeneous systems.

In one embodiment, a detected "event" "Rohit is going to San Francisco to buy that $5000 laptop from Sony" is organized into canonical topics and assigned who-what-when-where XML tags. According to this embodiment, the information becomes "<WHO>Rohit</WHO> is going to <WHERE>San Francisco</WHERE> to buy that <PRICEtype="usd">5000</PRICE><WHAT> laptop from Sony</WHAT>"

after being marked up. Note that the who-what-when-where XML tags also include a price XML tag.

4. Persistent Subscription to a Topic of Interest

Recall that one aspect of the invention facilitates the users 102 to persistently express an interest in a topic. When a user 102 subscribes to one or more topics, the information control network 108 searches for information related to the topic. When such information is found, the user 102 may be notified. Unlike with conventional systems, the user 102 does not have to make multiple manual requests for information. Instead, the user 102 makes one subscription indicating a persistent interest in the topic(s).

A user 102 also can persistently subscribe to a web user, which is a person, or a web resource, which is any device that can be referenced by a uniform resource locator (URL). A web resource may also be a queue, event stream, etc., such as an electronic ticker tape.

Figure 4:
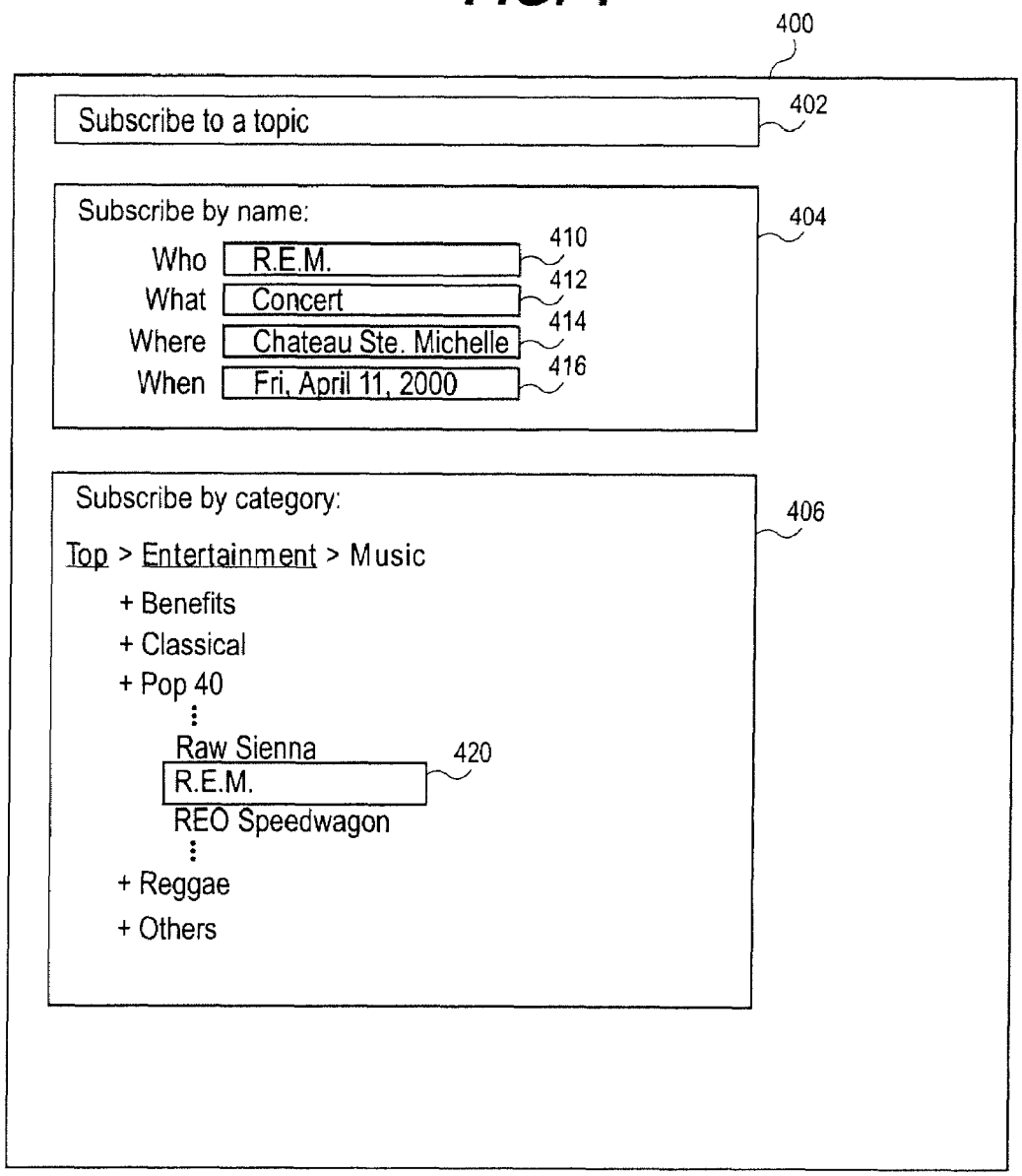
FIG. 4 illustrates a display on a client computer of an exemplar user interface whereby a user can persistently subscribe to a topic by name or by category.

FIG. 4 shows a display on a client computer 104 of an exemplar user interface 400 whereby a user 102 can persistently subscribe to a topic by name or by category. The user interface 400, as well as other user interfaces described herein, run on a computer display and are viewable and operable by a user 102. The user 102 simply selects the particular window by clicking on it. Some windows allow the user 102 to make entries via a computer keyboard. Other windows, when clicked on, transport the user 102 to another user interface.

The user interface 400 depicts a "Subscribe to a topic" heading 402, a "Subscribe by name" window 404, and a "Subscribe by category" window 406. To subscribe by name, the user 102 selects a "who" window 410 and enters a name, selects a "what" window 412 and enters a thing, selects a "where" window 414 and enters a location, and selects a "when" window 416 and enters a date, time, etc. According to the exemplar of FIG. 4, a user 102, Miguel, subscribes to an R.E.M. concert at Chateau Ste. Michelle Winery in Woodinville, Wash. for Friday, Apr. 11, 2000 when the user 102 enters "R.E.M." in the "who" window 410, "concert" in the "what" window 412, "Chateau Ste. Michelle" in the "where" window 414, and "Fri, Apr. 11, 2000" in the "when" window 416.

Alternatively, a user can persistently subscribe to a category. To subscribe to R.E.M. by category, the user 102 selects the R.E.M. window 420.

among any of the hyponyms. Although not shown, the user 102 also can select a category other than Entertainment.

Figure 5:
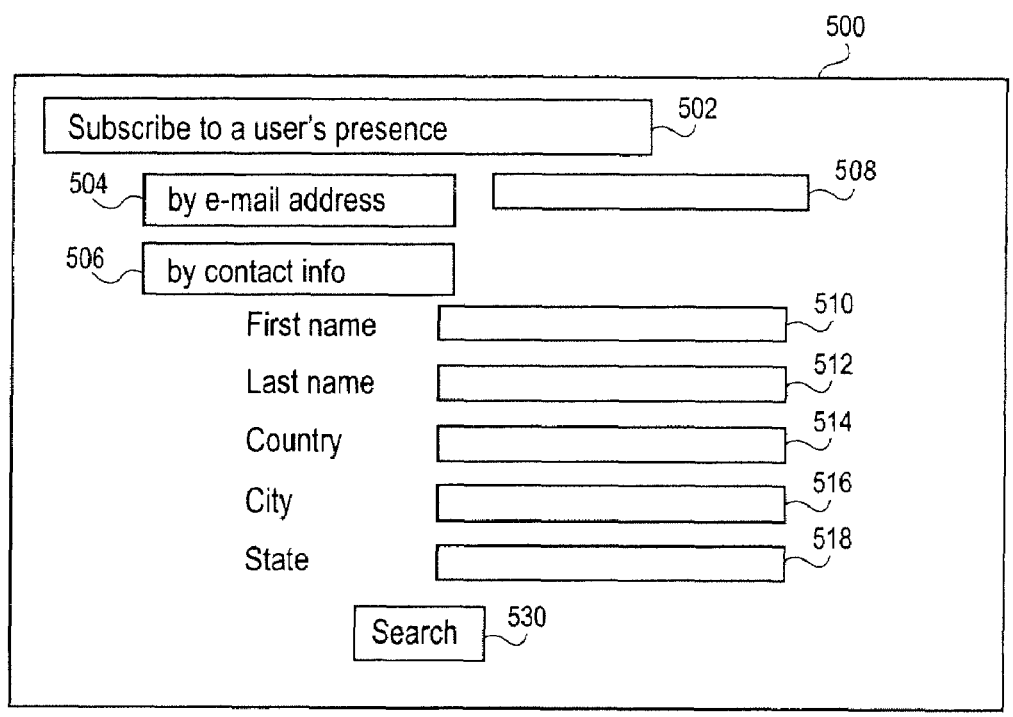
FIG. 5 illustrates a display on a client computer of an exemplar user interface whereby a user can persistently subscribe to a user's presence.

FIG. 5 shows an exemplar user interface 500 whereby a user 102 can persistently subscribe to a user's presence. The subscription manager 320 may perform some of the functions described with reference to FIGS. 4, 5, and 6. The user interface 500 depicts a "Subscribe to a user's presence" heading 502, a "by e-mail address" heading 504, and a "by contact" heading 506. To subscribe by e-mail address, the user 102 selects an "e-mail address" window 510 and enters an e-mail address, such as johndoe@mycorporation.com. To subscribe by contact info, the user 102 selects a "First name" window 510 and enters a person's first name, selects a "Last name" window 512 and enters a person's last name, selects a "country" window 514 and enters a country, and selects a "city" window 516 and enters a city, and/or selects a "State" window 518 and enters a state. The user 102 selects a "Search" window 530 to check for the presence for persons matching entries.

Figure 6:
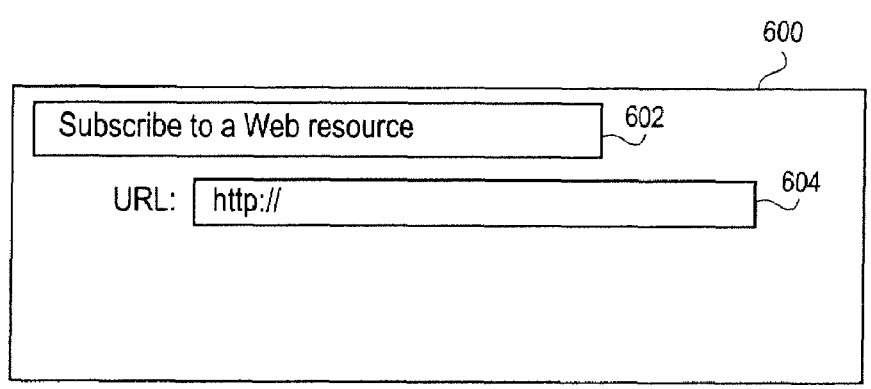
FIG. 6 illustrates a display on a client computer of an exemplar user interface whereby a user can persistently subscribe to a web resource.

FIG. 6 shows an exemplar user interface 600 whereby a user 102 can persistently subscribe to a web resource. The user interface 600 depicts a "Subscribe to a Web resource" heading 602. To subscribe to a web resource, the user 102 selects a "URL" window 604 and enters a URL, such as http://www.bstz.com or http://www.knownow.com.

The subscription manager 320 receives the entries as subscription data, processes the subscription data, and stores it for use by the information control network 108. The users 102 are persistently subscribed to the entered user's presence, topic(s), and web resources.

Subscription data can be stored in a database according to Table 1, which illustrates an embodiment of a Subscription Table. The Subscription Table shows that Joe has subscribed to any Seattle R.E.M. concert and Bill has subscribed to books related to R.E.M. Bill's subscription persists until May 1, 2001. John has subscribed to all concerts, regardless of the venue, the date, or who is playing. Bob has subscribed to any REO Speedwagon information. Note that the Subscription Table shows from the example above that Miguel has subscribed to the R.E.M. concert at the Chateau Ste. Michelle Winery on Apr. 11, 2000.

TABLE 1

Subscription Table

| WHO | WHAT | WHERE | WHEN | USER |
|---|---|---|---|---|
| . | . | . | . | . |
| . | . | . | . | . |
| . | . | . | . | . |
| R.E.M. | Concert | Seattle | * | Joe |
| R.E.M. | Concert | Chateau Ste. Michelle | Apr. 11, 2001 | Miguel |
| R.E.M. | Book | | Until May 1, 2001 | Bill |
| * | Concert | | * | John |
| REO Speedwagon | * | | * | Bob |
| . | . | . | . | . |
| . | . | . | . | . |
| . | . | . | . | . |

Note that the "Entertainment" is the category and "Music" is a hyponym of "Entertainment." There are various hyponyms of "music," including "Benefits," "Classical," "Pop 40," "Reggae," and "Others." Note also that "Pop 40" includes the groups Raw Sienna and REO Speedwagon as well as the group R.E.M. The user 102 can select from In an embodiment, a user subscribes to a message by pointing a web browser to an event. For example, take "kirksoffice/printer?subscribe=pinteroutofpaper" as a means to subscribe Kirk's web browser to receive notifications that the printer in his office is out of paper. Kirk's web browser waits for a printer to issue an "out of paper" message. When the printer issues an "out of paper" message, the message appears on Kirk's web browser. In another embodiment, a user subscribes to be notified on her spreadsheet whenever expenses in her department exceed $500,000. Other embodiments will be readily apparent to persons of ordinary skill in the relevant art reading the description herein.

5. Topic-Interest Based Information Routing

Recall that one aspect of the invention routes information to a user based on the user's level of interest in a topic. Initially, a user subscribes to a topic. The user then registers a device or application for the subscription. "Subscription" refers to what to send or receive, i.e., information related to a topic, a user, a device, an application, or a resource, while "registration" refers to where to send information, i.e., to a pager, buddy list, etc. The user then specifies a level of interest in a particular topic by establishing preferences.

In one embodiment, subscribing to a topic implicitly registers the device used to subscribe. The information control network 108 recognizes that the device used to subscribe to the topic is unknown to the information control network 108 and automatically registers the device.

Registration also can refer to from where information is published. This is described in greater detail with reference to FIG. 8 below.

The information control network 108 aggregates the user 102's registrations, subscriptions, and preferences, and filters information such that when information relating to the subscribed topic is found, the information control network 108 routes the information on a topic-interest basis. This quells the barrage of alerts, events, etc., from brokers, doctors, auctioneers, etc., such that potential interruptions become decisions.

Figure 7:
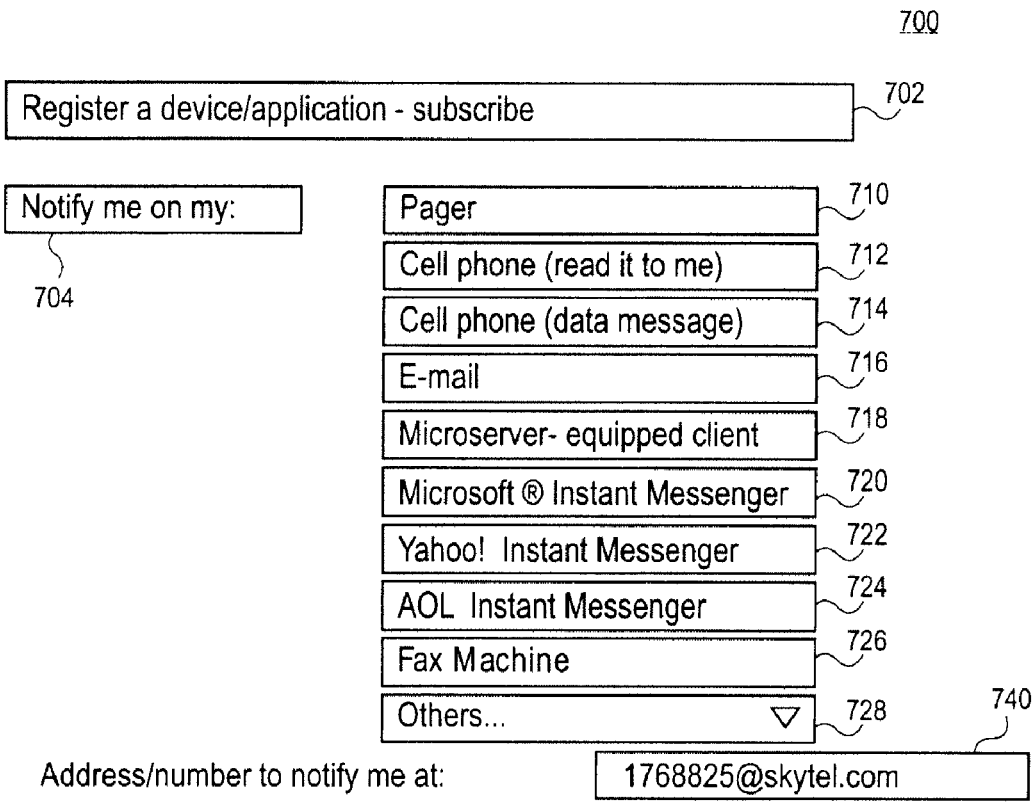
FIG. 7 illustrates a display on a client computer of an exemplar user interface whereby a user can register a device or application to receive information, as it becomes available, under a subscription.

FIG. 7 is an exemplar user interface 700 whereby a user can register a device or application on which to receive subscribed to information. The registration manager 330 may perform some of the functions described with reference to FIGS. 7 and 8. The user interface 700 depicts a "Register a device/application—subscribe" heading 702 and a "Notify me on my" heading 704.

To register a pager, the user 102 selects a "pager" window 710 and enters a pager address in an "Address/number to notify me at:" window 740. The pager address according to the example in FIG. 1 has been entered as "1768825@skytel.com." As the information becomes available it is sent to the address entered in the window 740.

To register a cellular telephone for information in audio, the user 102 selects a "Cell phone (read it to me)" window 712 and enters a telephone number in the "Address/number to notify me at:" window 740. The information subscribed to is read to the subscriber over the cellular telephone as the information becomes available. To register a cellular telephone for information in text, the user 102 selects a "Cell phone (data message)" window 714 and enters a telephone number in the "Address/number to notify me at:" window 740. The information subscribed to is sent to the cellular telephone in text form as the information becomes available.

To register to receive information via email, the user 102 selects an "e-mail" window 716 and enters an email address in the "Address/number to notify me at:" window 740. As the information becomes available it is sent by email to the email address entered in the window 740.

To register to receive information via a microserver-equipped client computer, such as the client computer 104a, the user 102 selects a "microserver-equipped client" window 718 and enters an address in the "Address/number to notify me at:" window 740. As the information becomes available it is sent to the address entered in the window 740.

To register to receive information via an instant messenger, the user 102 selects a "Microsoft® Instant Messenger" window 720, for Microsoft®, a "Yahoo! Instant Messenger" window 722 for Yahoo!, and "AOL Instant Messenger" window 724, for America On Line Instant Messenger. The user 102 enters an instant messenger address "Address/number to notify me at:" window 740. As the information becomes available it is sent to instant messenger address entered in the window 740.

To register to receive information via a facsimile machine, the user 102 selects a "fax machine" window 726 and enters a telephone number in the "Address/number to notify me at:" window 740. As the information becomes available it is sent to facsimile number entered in the window 740.

To register to receive information via other devices or applications, the user 102 selects an "others . . . " window 728 and enters an address or telephone number in the "Address/number to notify me at:" window 740. Other devices include any device capable of communicating electronically. Other applications include word processing applications, spreadsheets, accounting applications, web browsers, file sharing applications, etc. As the information becomes available it is sent to address or telephone number entered in the window 740.

Figure 8:
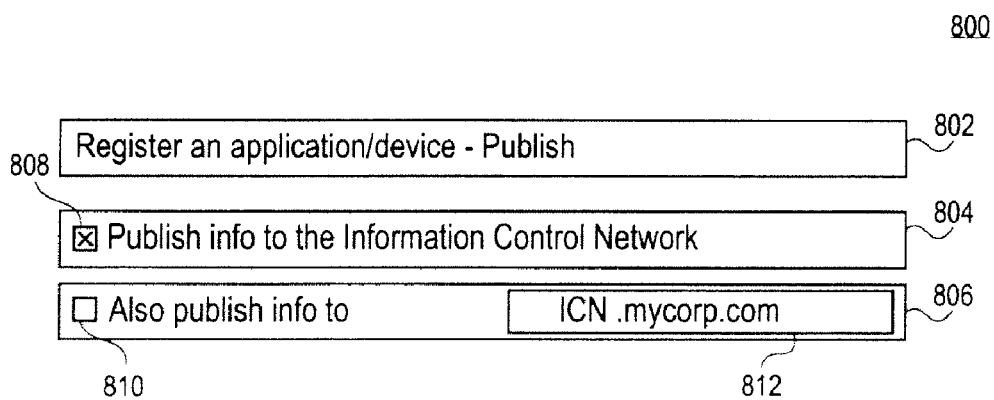
FIG. 8 illustrates a display on a client computer of an exemplar user interface whereby a user can register a device or application to publish information.

FIG. 8 is an exemplar user interface 800 whereby a user can register an application or device from which to publish information. The user interface 800 depicts a "Register an application/device—publish" heading 802, a "Publish info to the Information Control Network" window 804, and an "Also publish info to" window 806. To register to publish information to the information control network 108, the user 102 selects a box 808.

To register to publish information to a location other than the information control network 108, the user 102 selects a box 810, and enters a location, usually in the form of an address, in the window 812. According to the example in FIG. 8, the user 102 has entered a URL (ICN.mycorp.com).

Figure 9:
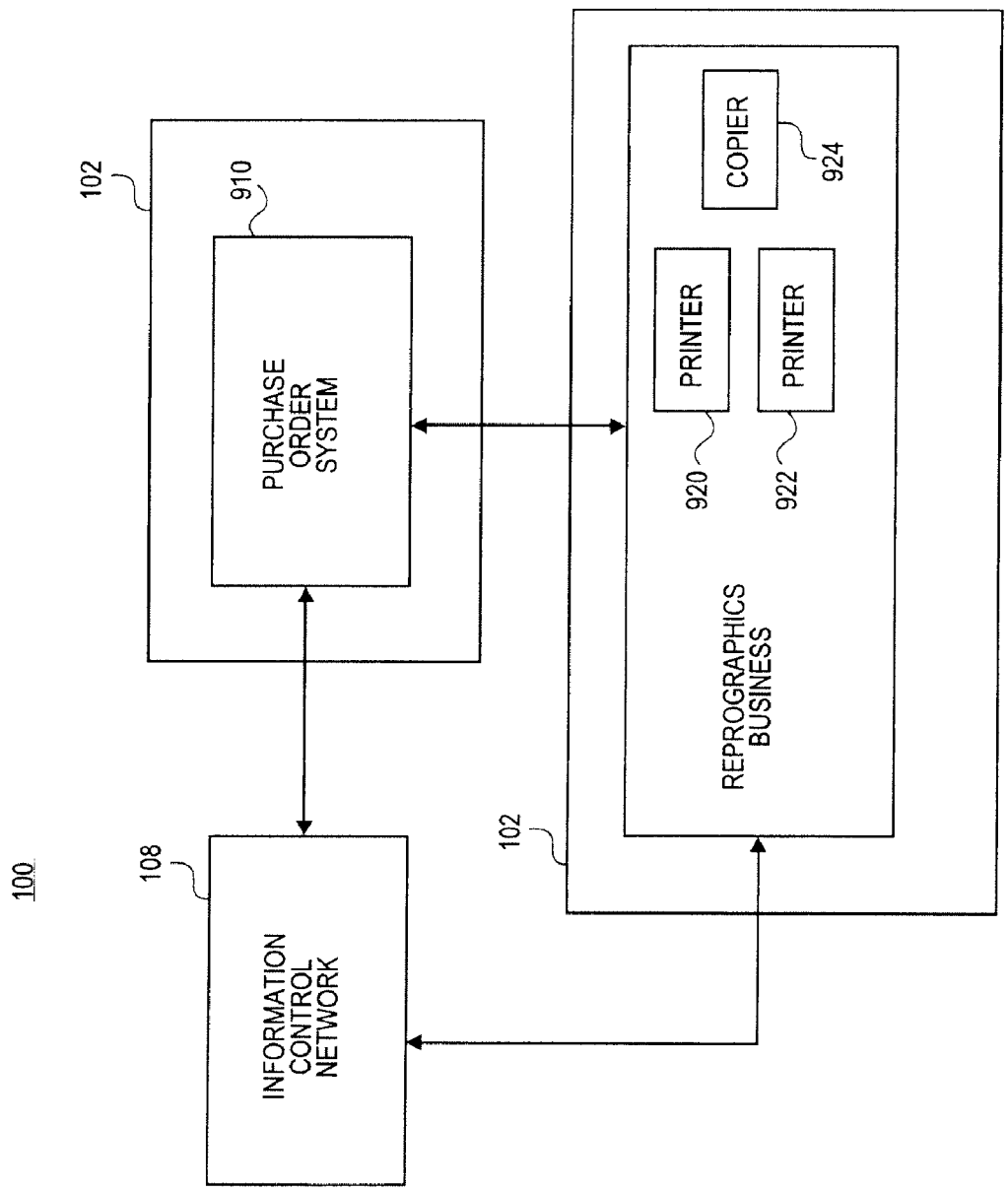
FIG. 9 illustrates a purchase order system embodiment.

FIG. 9 shows an embodiment where a purchase order system 910 registers and subscribes to information related to printers 920 and 922 and to a copier 924, which may be located at a Reprographics Business 926, such as Kinko's®. The Reprographics Business 926 has registered to publish information related to printers 920 and 922 and the copier 924 to the information control network 108. Whenever the printer 920 or 922 or the copier 924 publishes information indicating that it is out of paper, the purchase order system 910 receives this information.

Alternatively, the Reprographics Business 926 has registered to publish information related to printers 920 and 922 and the copier 924 to the purchase order system 910. In this embodiment, whenever the printer 920 or 922 or the copier 924 publishes information indicating that it is out of paper, the purchase order system 910 receives this information directly.

The purchase order system 910 can act on the subscribed to information in various ways, including placing an order for paper to be sent to the Reprographics Business 926. Note that no human intervention in this transaction, and in many aspects of the invention, no human intervention is necessary.

A user 102 also may specify certain preferences for subscriptions, including threshold levels of interest in a topic. One embodiment allows a user 102 to assign a priority level for thresholds such that below a certain threshold, information is routed in one manner, and above a certain threshold, information is routed in another manner. For example, a user 102 may prefer to have information sent to his or her cellular phone in the mornings and afternoons during commuting times and to his or her laptop computer during the middle of the day. On weekends, the user 102 may prefer to be contacted on his or her pager. Both the sender's preferences and the recipient's preferences are taken into consideration.

Alternatively, the information control network 108 can adaptively adjust a user's level of interest. In one embodiment, the network sends information to a user. If the user never acknowledges receipt of information, the information control network 108 interprets the failure to acknowledge as a lack of interest and adjusts the preferences accordingly. This process can be iterative and dynamic such that the information control network 108 continually adapts to the user 102.

A user 102 can specify that if there are any messages from her parents, the information control network 108 should find the user, notifying the user 102 on any registered device or application. In this instance the information control network 108 escalates the priority on the device(s) or application(s) accordingly. The notification does not necessarily have to be on a registered device or application. For example, the information control network 108 can dispatch a skywriter to deliver notifications, put messages on reader boards or electronic billboards, or other instrumentality to ensure the user 102 is notified.

Figure 10:
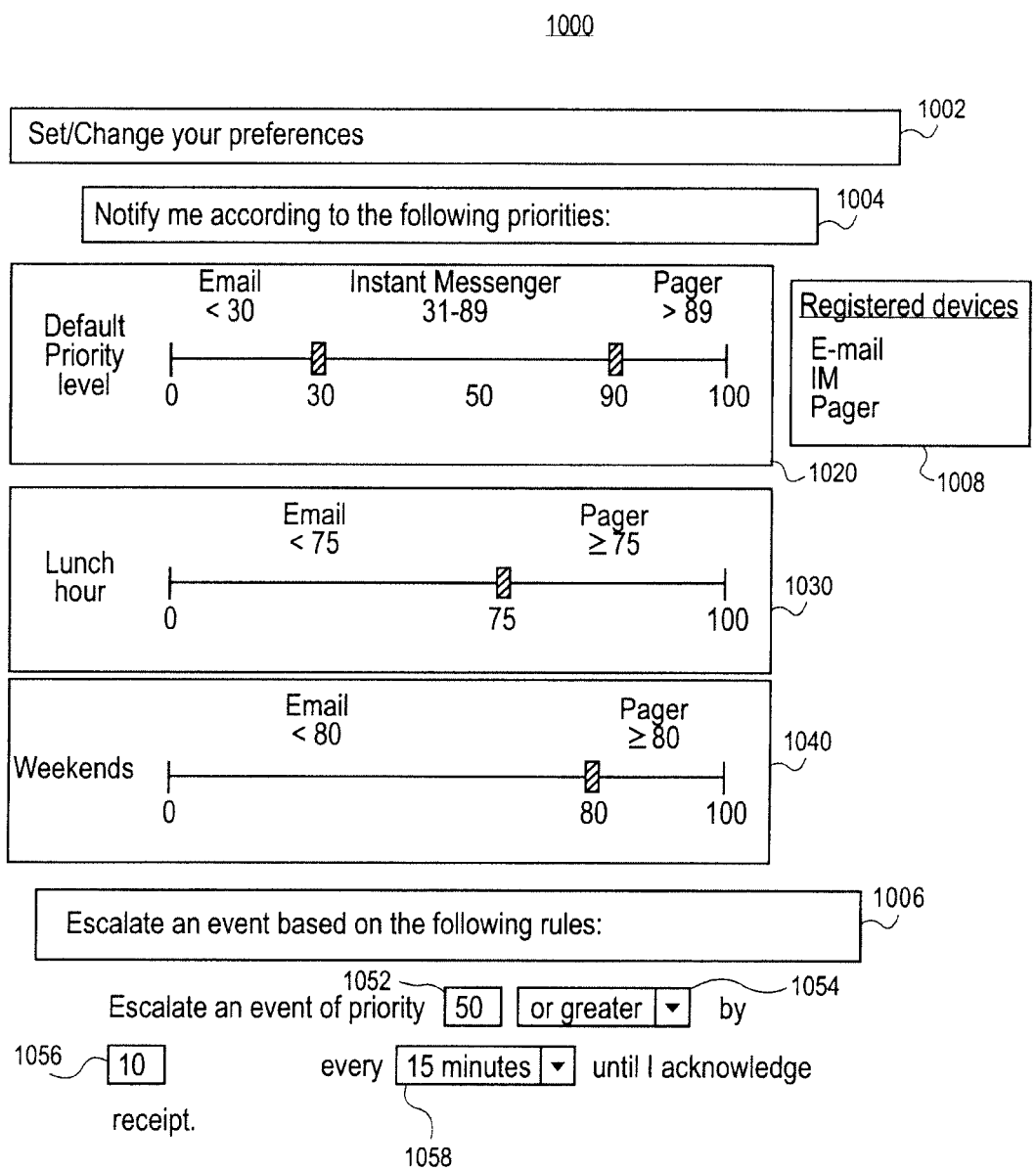
FIG. 10 illustrates a display on a client computer of an exemplar user interface whereby a user can set or change preferences for devices, applications, times, dates, or time frames.

FIG. 10 is a user interface 1000 whereby a user 102 establishes or changes preferences. The router 304 and the priority module 308 may perform some of the functions described when referring to FIG. 10. The user interface 1000 depicts a "Set/Change your preferences" heading 1002, a "Notify me according to the following priorities:" heading 1004, and an "Escalate information based on the following rules" heading 1006. In a widow 1008, the user interface 1000 also shows the devices and applications that the particular user 102 has registered, which include e-mail, instant messaging (IM), and a pager.

The windows under the "Notify me according to the following priorities:" heading 1004 allow a user 102 to establish priorities for devices and applications, times, and dates. To set a preference for a device or application default priority level, the user 102 engages a "Default Priority Level" window 1020. One embodiment allows a user 102 to assign a priority between 0 and 100 for thresholds. The example in FIG. 10 shows that for a particular subscription the user 102 prefers to receive information, as it becomes available, with a priority of 30 to his email, information with a priority between 31 and 89 on his instant messenger, and information with a priority greater than 89 on his pager. Of course, the user 102 can set or change preferences for other devices and applications not shown in FIG. 10.

To set a lunchtime preference, the user 102 engages a "Lunch hour" window 1030. The example in FIG. 10 shows that during lunchtime the user 102 prefers to receive information, as it becomes available, with a priority less than 75 on his email and information with a priority greater than or equal to 75 on his pager. Of course, the user 102 can set or change preferences for other times not shown in FIG. 10.

To set a preference for receipt of information during weekends, the user 102 engages a "Weekends" window 1040. The example in FIG. 10 shows that on weekends the user 102 prefers to receive information, as it becomes available, with a priority less than 80 on his email and information with a priority greater than or equal to 75 on his pager. Of course, the user 102 can set or change preferences for other days (e.g., holidays, travel days, etc.) not shown in FIG. 10.

Once the default priority levels are set for the device(s) or application(s) of interest, the information control network 108 may generate a device profile. The device/application profiles can be as follows. Email receives all information with a priority of less than 30 during the week, with a priority of less than 75 during the week at lunchtime, and with a priority of less than 80 on the weekends. Instant messenger only receives information during the week, and only information with a priority between 31 and 89.

The windows under the "Escalate information based on the following rules" heading 1006 allow a user 102 to establish priorities for certain events. According to the entries in the windows under the "Escalate information based on the following rules" heading 1006, the router 304 escalates any event having a priority of 50 (window 1052) or greater (window 1054) by 10 (window 1056) every fifteen minutes (window 1058) until the user 102 acknowledges receipt of the information.

In one embodiment, the default priority level for any preference is 75. Continuing with an example from Table 1—Subscription Table above, Miguel has a default priority of 75 for information about the R.E.M. concert at Chateau Ste. Michelle.

Once a user 102 has registered devices and applications, made subscriptions, and specified preferences, the result is a topic-interest profile. The topic-interest profile for Miguel's R.E.M. event according to the preferences of the example in FIG. 10 is as follows. If Miguel receives her R.E.M. event during the week at 10:00 o'clock in the morning, the event is routed to her instant messenger. If Miguel receives her R.E.M. event during the week at lunchtime, the event is routed to her pager. If Miguel receives her R.E.M. event on the weekend, the event is routed to her email. These may change if Miguel fails to acknowledge receipt of the event, in which case the priority is escalated. A user 102 also can train the router 304 by providing a "more urgent" or "less urgent" response to information.

The information control network 108 routes information using the "who, what, when, where" XML tags as a message protocol rather than a static, binary, language-specific application programming interface (API) that can trip up internet-scale heterogeneous systems. The "who, what, when, where" message protocol ensures interoperability with other proprietary devices, platforms, systems, etc.

Typically, there are many users 102, often millions. In this case, the router 304 uses a consistent hashing algorithm to calculate the set of subscribers needing to receive the information relating to the subscribed topic.

6. Notification on Microserver-Equipped Clients

After a user 102 has subscribed, registered, and set preferences, the information control network 108 notifies the user 102 whenever information is sensed that matches the subscription, registration, and preferences. Notification is thus sent to pagers, instant messaging, spreadsheets, cellular telephones, etc., according to profiles described above.

For example, the user 102 who prefers to have information sent to his cellular phone in the mornings gets notified on his cell phone in the mornings. He is notified on his cell phone in the afternoons and during commuting times. He is notified on his laptop computer during the middle of the day. On weekends, he is notified on his or her pager. Suppose the user 102 wants to be notified whenever any story about Akamai is posted to the New York Times web site. The user 102 does not want to have to get the whole "newspaper," just the Akamai story. When the story is posted, the registered user device or user application is notified and the changes are automatically synchronized. The information control network 108 knows which device or application to notify based on the user's profiles.

Recall that Miguel has a subscription to information about the R.E.M. concert at Chateau Ste. Michelle, also has registered the client computer 104a to receive information, as it becomes available, and the microserver 106 to publish information. Conventionally, Miguel might get an email announcing that tickets have gone on sale, which he may miss, especially if it is the weekend. Alternatively, Miguel is asleep and does not want to be awakened.

According to an aspect of the invention, the microserver 106 facilitates users being able to persistently submit requests for information, and subsequently receive the information as they become available, without requiring the users to remain "connected" to the information control network 108, while awaiting availability of the requested information. For example, when the sensor 306 has detected an "event" indicating that tickets are now on sale for the R.E.M. concert at Chateau Ste. Michelle on Friday, Apr. 11, 2001, the information control network 108 notifies Miguel's client computer 104a. The microserver 106 establishes a connection with a server at Ticket Master and sends a request to purchase four tickets to the R.E.M. concert. When Ticket Master's server requests billing information for Miguel, the microserver 106 accesses Miguel's credit card information stored on the client computer 104a in a well-known manner and provides the credit card information to Ticket Master. The microserver 106 permits Miguel to purchase tickets regardless of where he is or what time it is.

The same can be said for the paper being ordered from Kinko's® for the copiers and printers. That is, no matter what time of day, day of the week, or what topic, subscribers are notified of even obscure information and actions are taken as though a human were actively involved in the transactions.

7. Example Computer System

Figure 11:
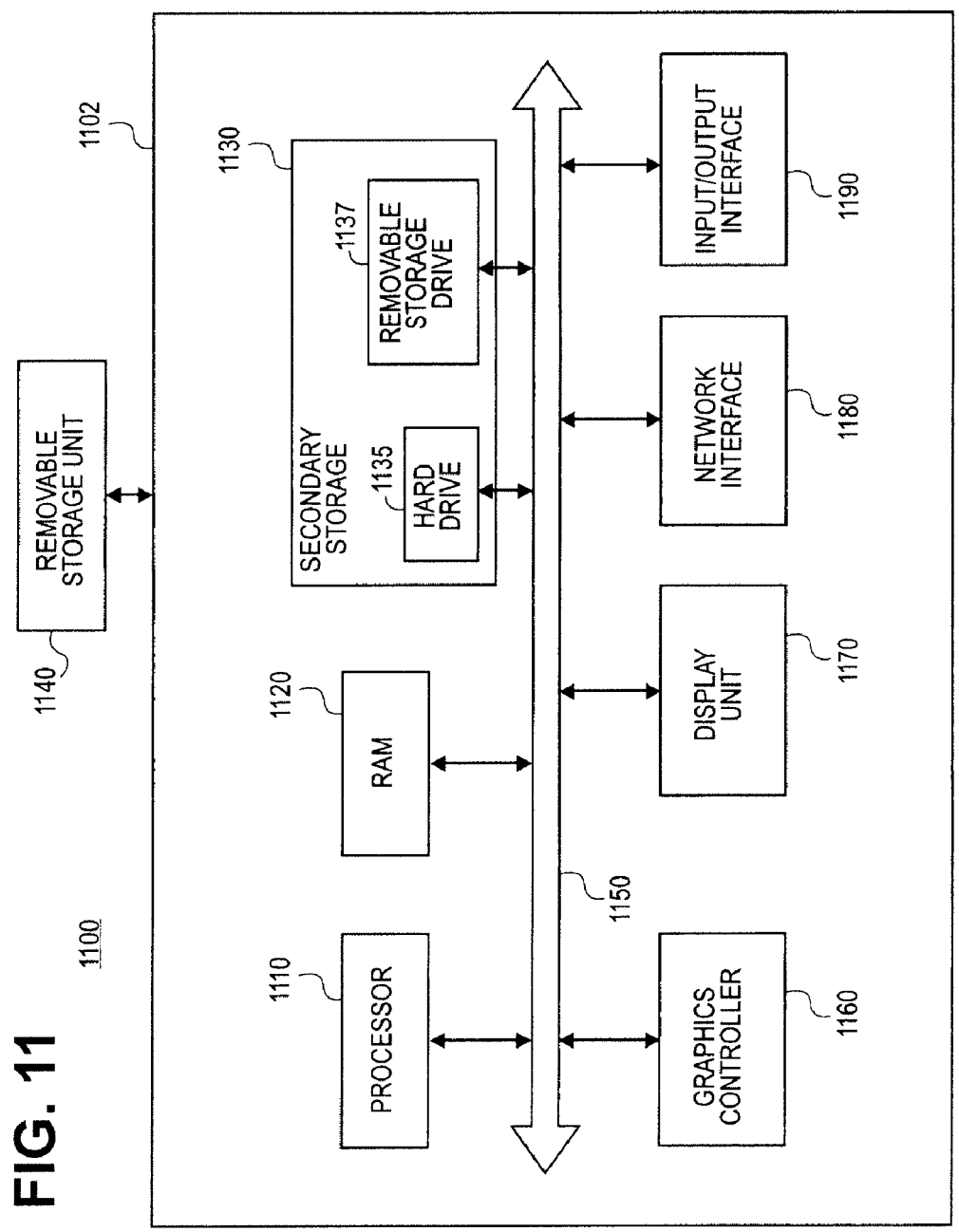
FIG. 11 is an exemplar computer processor suitable for implementing aspects of the invention.

FIG. 11 is a block diagram of an exemplar computer system 1100 to facilitate a user to set up and participate in open web communications. Even though computer system 1100 is described with specific components and architecture for illustration, it should be understood that the invention could be implemented in other ways. For example, the invention can be implemented on multiple cooperating networked computer systems. In addition, each component can be implemented as a combination of one or more of hardware, software and firmware. Moreover, each subscriber, publisher, client system, computer server system, as well as the information control network 108 has some or all of the components contained in the exemplar computer system 1100, as required, to implement the functions described herein.

The computer system 1100 includes a main unit 1102 with one or more processors, such as processor 1110. The main unit 1102 also includes a random access memory (RAM) 1120, a secondary storage 1130, a graphics controller 1160, a display unit 1170, a network interface 1180, and an input interface 1190. All the components except the display unit 1170 can communicate with each other over a communication path 1150, which typically contains several buses, as is well-known in the relevant arts.

The processor 1110 executes instructions stored in RAM 1120 to provide several features of the invention. The RAM 1120 retrieves such instructions from the secondary storage 1130 using the communication path 1150. In the alternative, the instructions are retrieved on the network interface 1180 from an external computer server provided, for example, by an application service provider (ASP) or by another division within a same organization. The network interface 1180 typically is implemented using Internet protocol (IP).

The graphics controller 1160 receives commands and data on the communication path 1150 from the processor 1110, and generates display signals (e.g., in RGB format) to the display unit 1170. The display signals are generated according to the commands and data received on the communication path 1150. The display unit 1170 contains a display screen to display the images defined by the display signals. The input interface 1190 usually corresponds to a keyboard and/or mouse (not shown), and generally facilitates a user to provide inputs. Components suitable for implementing the processor 1110, the RAM 1120, the graphics controller 1160, the display unit 1170, the network interface 1180, and the input interface 1190 are well known.

The secondary memory 1130 typically contains a hard drive 1135 and a removable storage drive 1137. The hard drive 1135 stores the software instructions and data, which facilitate the computer system 1100 to provide several features in accordance with the invention. In the alternative, some or all of the data and instructions may be provided on removable storage unit 1140, and the data and instructions are read and provided by the removable storage drive 1137 to the processor 1110. A floppy disk drive, a magnetic tape drive, a compact disk read-only-memory (CDROM) drive, a digital video disk (DVD) drive, a removable memory chip (e.g., a PCMCIA Card, and EPROM, etc.) are examples of suitable components to implement the removable storage drive 1137.

The removable storage unit 1140 is detachable from the main unit 1102. In general, the removable storage unit 1140 is implemented using a medium and storage format compatible with the removable storage drive 1137 such that the removable storage drive 1137 can read the data and instructions. Thus, the removable storage unit 1140 includes a computer usable storage medium having stored therein computer software and/or data. An embodiment of the invention is implemented using software running (that is, executing) in the computer system 1100. In this document, the term "computer program product" is used generally to refer to the removable storage unit 1140 or a hard disk installed in the hard drive 1135. These computer program products are means for providing software to the computer system 1100.

As noted above, computer programs (also called computer control logic) are stored in the main memory (RAM 1110) and/or the secondary storage 1130. In the embodiments implemented using software, the software may be stored in a computer program product and loaded into the computer system 1100 using the removable storage drive 1137, the hard drive 1135, or the network interface 1180. The control logic (software), when executed by the processor 1110, causes the processor 1110 to perform the functions of the invention as described herein.

The operation and implementation of the control logic (software) can be best understood by considering example implementations different software modules, which may, together, implement various aspects of the invention.

8. Conclusion

Having described and illustrated the principles of the invention with reference to illustrated embodiments, it will be recognized that the illustrated embodiments can be modified in arrangement and detail without departing from such principles.

And, even though the foregoing discussion has focused on particular embodiments, it is understood that other configurations are contemplated. In particular, even though expressions such as "in one embodiment," "in another embodiment," and the like are used herein, these phrases are meant to generally reference embodiment possibilities, and are not intended to limit the invention to particular embodiment configurations.

As used herein, these terms may reference the same or different embodiments, and unless expressly indicated otherwise, are combinable into other embodiments. Consequently, in view of the wide variety of permutations to the above-described embodiments, the detailed description is intended to be illustrative only, and should not be taken as limiting the scope of the invention. What is claimed as the invention, therefore, is all such modifications as may come within the scope and spirit of the following claims and equivalents thereto.

What is claimed is:

1. A method of delivering information to a client from a server, comprising:
    receiving a request from the client to subscribe to establish a hypertext transport protocol communication path to the server;
    monitoring and detecting publication of information in a network;
    organizing the detected information into one or more events and routing the one or more events to a set of topics;
    facilitating the client to persistently subscribe to at least one topic selected from among the set of topics;
    opening a hypertext transport protocol communication path to the client;
    automatically and transparently launching a microserver on the client; and
    maintaining open the hypertext transport protocol communication path to the client while delivering at least one event of the one or more events to the client via the hypertext transport protocol communication path immediately upon detection based on a subscription to the at least one topic selected from the set of topics, wherein delivering the at least one event of the one or more events to the client is not in response to a request from the client to establish the hypertext transport protocol communication path, wherein the delivering the at least one event of the one or more events to the client is initiated by the server after the hypertext transport protocol communication path has been established.

2. The method of claim 1, further comprising organizing information into non-events, alerts, messages, queries, data, data content, patterns, streams, or queues.

3. The method of claim 1, further comprising facilitating a user to persistently subscribe to a web resource, based on a universal resource locator (URL).

4. The method of claim 1, further comprising facilitating a user to persistently subscribe to a web user, based on an email address, a name or a location, and to specify a level of interest in the web user.

5. The method of claim 1, further comprising facilitating a user to persistently subscribe to a user's presence, based on an email address, a name or a location, and to specify a level of interest in the web user.

6. The method of claim 1, further comprising registering a pager, cellular telephone, email, instant messenger, purchase order system, microserver-equipped client computer, facsimile machine, web browser, or spreadsheet and routing information to the user on the registered pager, cellular telephone, email, instant messenger, purchase order system, microserver-equipped client computer, facsimile machine, web browser, or spreadsheet, based on the selected topic and level of interest in the selected topic.

7. The method of claim 1, further comprising filtering the information, based on the selected topic and level of interest in the selected topic, and delivering the filtered information to the user on a client system having an embedded microserver.

8. The method of claim 1, further comprising filtering the information based on the selected topic and level of interest in the selected topic, delivering the filtered information to the user on a client system having an embedded microserver, and facilitating the user to reply to the filtered information using the embedded microserver.

9. The method of claim 1, further comprising:
    permitting a client to request a new hypertext transport protocol communication path if the previous hypertext transport protocol communication path experiences a failure; and
    permitting the client to be notified of the one or more events that would have been transmitted to the client during the duration of the failure.

* * * * *